United States Patent [19]
Gandini

[11] Patent Number: 5,205,160
[45] Date of Patent: Apr. 27, 1993

[54] DEVICE FOR MEASURING THE CONSUMPTION OF FUEL IN AN INTERNAL COMBUSTION ENGINE

[76] Inventor: Roberto Gandini, Via Einaudi 23, Quinzano D'Oglio (Brescia), Italy

[21] Appl. No.: 756,917

[22] Filed: Sep. 9, 1991

[30] Foreign Application Priority Data

Sep. 13, 1990 [IT] Italy ................. 21459 A/90

[51] Int. Cl.⁵ .............................................. G01F 9/00
[52] U.S. Cl. ................................................. 73/113
[58] Field of Search ................. 73/114, 113, 223, 224

[56] References Cited

U.S. PATENT DOCUMENTS 3,714,823 2/1973 Wilkens et al. .................. 73/113
4,253,330 3/1981 Kato ................................. 73/113
4,253,332 3/1981 Sabatino et al. ............... 73/113 X

FOREIGN PATENT DOCUMENTS 345009 8/1978 Austria .
3732293 4/1989 Fed. Rep. of Germany .
2041526 9/1980 United Kingdom .

*Primary Examiner*—Jerry W. Myracle
*Attorney, Agent, or Firm*—Oblon, Spivak, McClelland, Maier & Neustadt

[57] ABSTRACT

Device for measuring the consumption of fuel in an internal combustion engine, the device being inserted in a feed system between a fuel tank and an injection group, wherein the device includes a cup provided with a lever sensor which controls the actuation of a suction pump communicating with the fuel tank and wherein the cup, fed by a pipe coming from the suction pump and by a return pipe coming from the injection group, is connected with the injection group by a delivery pipe, and the suction pump, being controlled by the level sensor, supplying the consumption data to a counter/totalizer device.

8 Claims, 1 Drawing Sheet

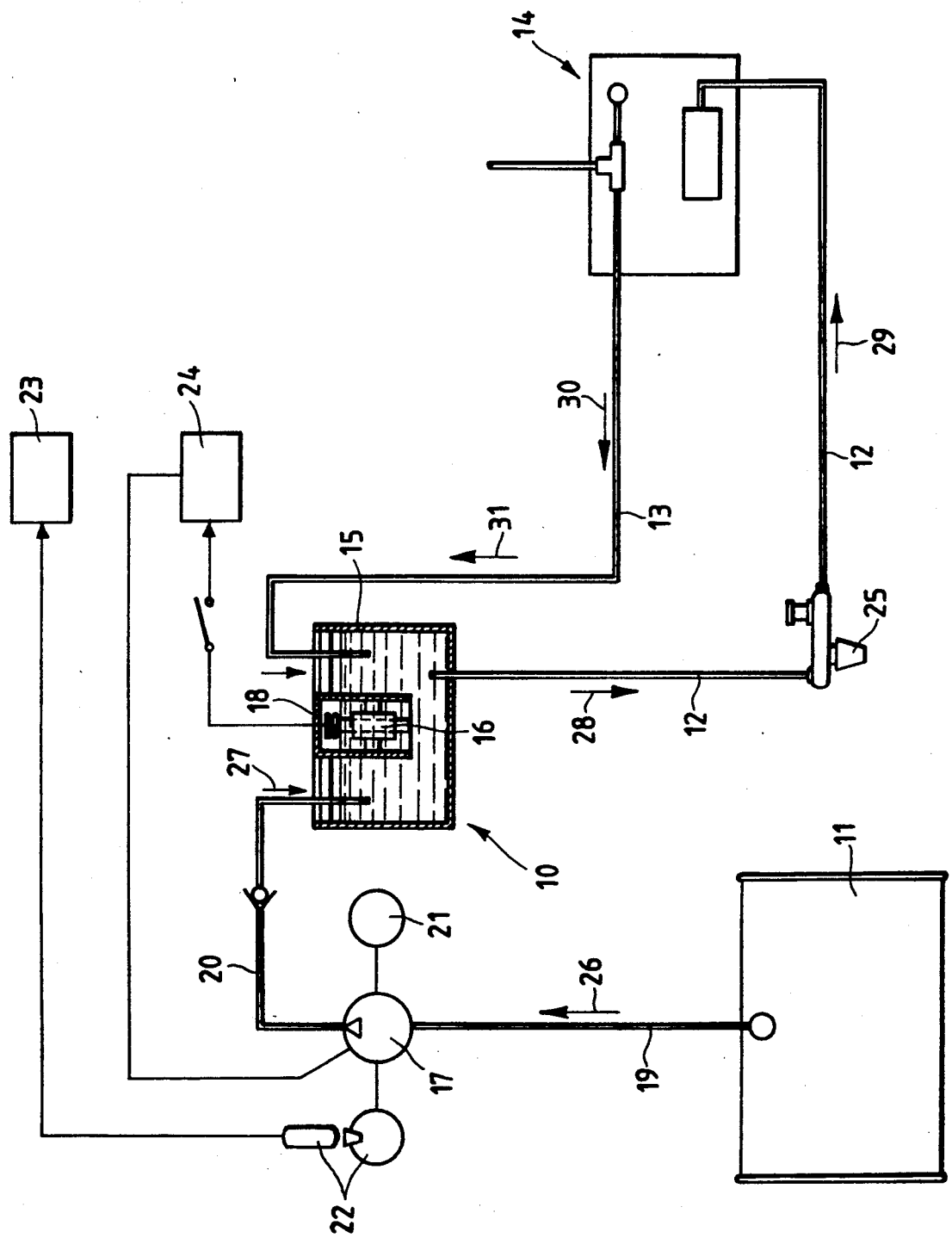

DEVICE FOR MEASURING THE CONSUMPTION OF FUEL IN AN INTERNAL COMBUSTION ENGINE

BACKGROUND OF THE INVENTION

1. Field of the Invention

The present invention relates to a device for measuring the consumption of fuel in internal combustion engines.

2. Discussion of the Background

Devices for measuring the fuel consumption, of volumetric type, are known, which use turbines installed in the delivery pipes which feed the injection group, and in the return pipes from said injection group. Such devices compute the fuel consumption and are generally used on vehicles and not in test rooms.

Owing to the acceleration and deceleration inertias, the turbines may give non-reliable values owing to flow changes, and can be negatively influenced by the presence of air bubbles, in particular in the return pipe.

Furthermore, such devices, owing to their using turbines, are definitively expensive.

On the contrary, the devices known from the prior art which are used in test rooms, use a fuel weighing system and, due to this feature, are difficult to be installed on vehicles, and hence are applied to an only limited extent.

SUMMARY OF THE INVENTION

The purpose of the present invention is for providing a device for measuring the fuel consumption, which supplies reliable results, can be used both on board vehicles and in test rooms, and which, moreover, is easy to be installed, and, above all, can be manufactured in an economically advantageous way.

In order to achieve this purpose, a device for measuring the consumption of fuel in an internal combustion engine, inserted in a feed system constituted by a fuel tank, delivery and return pipes and an injection group, was concerned, which device is characterized in that it comprises a cup provided with a level sensor which controls the actuation of a suction pump communicating with said fuel tank; said cup being connected at its inlet side with a pipe coming from said suction pump and with a return pipe coming from said injection group, and is, at its outlet side, connected with a delivery pipe which feeds said injection group, said suction pump being provided with impulse generator means suitable for incrementing a fuel consumption meter.

In particular, the sensor measures changes in the level of fuel inside said cup, causing said suction pump to b e actuated at any time when said level reaches a minimal value pre-calibrated on said sensor, and causes the operation of said suction pump to be discontinued at any time when said level reaches the maximum value precalibrated on said sensor.

The level sensor is arranged inside a glass-shaped container facing towards the bottom of said cup, with said container having a much smaller volume than said cup and being capable of containing a fuel amount with an essentially constant level relative to said cup.

In accordance to the invention, the level sensor can be a floating-body sensor, a capacitor sensor or an ultrasonic sensor.

According to a preferred form of a practical embodiment according to the present invention, the suction pump is a gear pump with a fixed displacement value.

According to a further form of a practical embodiment of the present invention, said suction pump and said impulse generator can be installed on said cup, to form one single unit with it.

BRIEF DESCRIPTION OF THE DRAWINGS

The technical characteristics and further advantages and features of the instant invention will be clearer from the following illustrative, non-limitative disclosure made by referring to the single accompaning drawing table, in which a schematic representation of the device of the present invention is shown.

DESCRIPTION OF THE PREFERRED EMBODIMENT

According to the figure, with the reference numeral 10 a device according to the invention is generally indicated, which is inserted in a fuel feed system for an engine, which system is constituted by a fuel tank 11, a delivery pipe 12 and a return pipe 13, and an injection group generally indicated by reference numeral 14.

The device 10 consists of a cup 15 equipped with a level sensor 16 which controls the actuation of an suction pump 17.

The level sensor 16 is arranged inside a container 18 having the shape of a cylindrical glass member with a much smaller volume than the cup 15, which cylindrical glass faces towards the bottom of said cup.

The suction pump 17 is in communication with the tank 11 through a suction pipe 19 and with the cup by means of the first inlet pipe 20; the pump, which is driven by a motor 21 and the gear pump with constant delivery, is furthermore provided with an impulse generator device 22.

The latter supplies the necessary impulses in order to increment a fuel consumption meter/totalizer device 23 connected with it.

The suction pump 17 is actuated by means of the relay 24 connected with the level sensor 16.

The delivery pipe 12 which feeds the injection group 14 is connected with the interior of the cup 15 and, downstream of said cup, can be equipped with a priming device or an auxiliary pump, indicated by reference numeral 25; the return pipe 13 from the injection group 14 constitutes, on the contrary, the second inlet pipe to the cup 15.

The route along which the fuel flows from the fuel tank 11 to the injection group is indicated by arrows 26, 27, 28 and 29, and the route in the return pipe 13 from the injection group towards the cup 15 is indicated by arrows 30 and 31.

The level sensor, which preferably is a level sensor of a capacitor type, is so calibrated as to cause the suction pump 17 to start operating when the fuel level inside the cup 15 reaches a pre-established minimum level. In the same way, the sensor is so calibrated as to discontinue the operation of the suction pump when the fuel level inside the cup 15 reaches a maximum pre-established level.

When the pump is actuated, the impulse generator 22 supplies the consumption meter/totalizer device with necessary data to cause the latter to be incremented and to supply the required consumption data.

In practice, a suitable calibration of the level sensor of very small differences between the minimum level and maximum level values will force the pump to operate in a quasi-continuous cycle mode. In this case, the device will supply instantaneous consumption data to the meter/totalizer device.

Inasmuch as it is of a much smaller volume than the cup, the container 18 with the cylindrical glass shape will also contain a reduced amount of liquid fuel, on which the level changes which may occur inside the cup due to slope changes of the road the vehicle is running along, will be substantially with no effect.

This feature and the structural simplicity of the device make it possible for the device according to the present invention to be adapted both in its static version, i.e., in test rooms, as well as on vehicles, without its reliability being impaired. Said structural simplicity makes it furthermore possible for reductions in costs to be achieved, which are considerable relatively to the measured instruments known from the prior art.

I claim:

1. A device for measuring the consumption of fuel in an internal combustion engine, inserted in a feed system which includes a fuel tank, delivery and return pipes and an injection group, wherein said device comprises:
   a suction pump communicated with the fuel pump;
   a cup provided with a level sensor which controls actuation of said suction pump; said cup being connected at an inlet side thereof with said suction pump by a first pipe and connected by a second pipe with said injection group, and, said cup being connected at an outlet side thereof, with a delivery pipe which feeds said injection group; and
   a fuel consumption meter wherein said suction pump includes impulse generator means for incrementing said fuel consumption meter.

2. A device according to claim 1 wherein said sensor includes means for measuring variations in the level of fuel inside said cup, for causing said suction pump to be actuated at any time when said level reaches a minimal value precalibrated on said sensor, and for causing operation of said suction pump to be discontinued when said level reaches a maximum value precalibrated on said sensor.

3. A device according to claim 1, wherein said level sensor is arranged inside a glass-shaped container facing towards a bottom portion of said cup, said container having a smaller volume than said cup and containing a fuel amount with a substantially constant level relative to said cup.

4. A device according to claim 1, wherein said level sensor comprises a floating-body sensor.

5. A device according to claim 1, wherein said sensor comprises a capacitor sensor.

6. A device according to claim 1, wherein said sensor comprises an ultrasonic-sensor.

7. A device according to claim 1, wherein said suction pump comprises a gear pump with a fixed delivery value.

8. A device according to claim 1, wherein said suction pump and said impulse generator are located in said cup for forming a single unit together with said cup.

* * * * *